(12) United States Patent
Laurent et al.

(10) Patent No.: US 10,393,307 B2
(45) Date of Patent: Aug. 27, 2019

(54) MULTI-CAVITY, SHRINKABLE SLEEVE AND METHOD OF CONSTRUCTION THEREOF

(71) Applicant: Federal-Mogul Powertrain, LLC, Southfield, MI (US)

(72) Inventors: Benoit Laurent, Trosly Breuil (FR); Patrick Thomas, Crepy en Valois (FR); Jean-Michel Munaro, Saint-Crépin aux Bois (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/796,333

(22) Filed: Oct. 27, 2017

(65) Prior Publication Data

US 2018/0119869 A1     May 3, 2018

Related U.S. Application Data

(60) Provisional application No. 62/414,518, filed on Oct. 28, 2016.

(51) Int. Cl.
*F16L 57/06*     (2006.01)
*H02G 3/04*     (2006.01)
(Continued)

(52) U.S. Cl.
CPC ............. *F16L 57/06* (2013.01); *B32B 1/08* (2013.01); *D03D 1/0035* (2013.01); *D03D 11/02* (2013.01);
(Continued)

(58) Field of Classification Search
CPC ........ B32B 1/08; D03D 15/04; D03D 1/0035; D03D 1/00; D03D 11/02; D03D 15/00;
(Continued)

(56) References Cited

U.S. PATENT DOCUMENTS

| 4,374,881 A | 2/1983 | Hamilton |
| 4,668,545 A | 5/1987 | Lowe |
| 2003/0044155 A1 | 3/2003 | Maiden |

FOREIGN PATENT DOCUMENTS

| EP | 0061294 A1 | 9/1982 |
| EP | 0175554 A2 | 3/1986 |

(Continued)

OTHER PUBLICATIONS

International Search Report, dated Jan. 31, 2018 (PCT/US2017/058927).

*Primary Examiner* — Camie S Thompson
(74) *Attorney, Agent, or Firm* — Robert L. Stearns; Dickinson Wright PLLC

(57) ABSTRACT

A textile sleeve for routing and protecting a plurality of elongate members in spaced relation from one another is provided. The sleeve includes a single piece, monolithic wall of interlaced yarn extending lengthwise between opposite ends of the sleeve. The wall includes a plurality of circumferentially continuous, tubular wall sections extending lengthwise between the opposite ends, with adjacent tubular wall sections being fixed in laterally spaced relation from another by an intervening single layer section. At least some of the yarn within each tubular wall section is provided as heat-shrinkable yarn, thereby providing each tubular wall section as being heat-shrinkable from a first, diametrically enlarged assembly state to a second, diametrically constricted state about a corresponding elongate member contained therein.

20 Claims, 6 Drawing Sheets

(51) Int. Cl.
*D03D 1/00* (2006.01)
*B32B 1/08* (2006.01)
*D03D 11/02* (2006.01)
*D03D 15/04* (2006.01)
*H02G 15/18* (2006.01)
*D04B 1/16* (2006.01)

(52) U.S. Cl.
CPC ............... *D03D 15/04* (2013.01); *D04B 1/16* (2013.01); *H02G 3/0481* (2013.01); *H02G 15/1806* (2013.01); *D10B 2401/041* (2013.01); *D10B 2501/061* (2013.01); *D10B 2505/02* (2013.01); *D10B 2505/12* (2013.01)

(58) Field of Classification Search
CPC ...... D03D 15/12; D03D 3/02; H02G 15/1806; H02G 3/0481; H02G 3/04; D04B 1/16; D04C 1/02; G02B 5/4459; F16L 57/06
USPC ......... 428/36.1, 34.1, 34.5; 139/387 R; 87/6, 87/8, 9; 28/142; 138/123; 174/350, 174/393, 93; 442/301, 319
See application file for complete search history.

(56) References Cited

FOREIGN PATENT DOCUMENTS

| | | | |
|---|---|---|---|
| EP | 0464429 A2 | 1/1992 | |
| WO | 2008145766 A1 | 12/2008 | |
| WO | WO-2008145766 | * 12/2008 | ........... H02G 3/0481 |
| WO | 2016075425 A1 | 5/2016 | |

\* cited by examiner

MULTI-CAVITY, SHRINKABLE SLEEVE AND METHOD OF CONSTRUCTION THEREOF

CROSS-REFERENCE TO RELATED APPLICATION

This application claims the benefit of U.S. Provisional Application Ser. No. 62/414,518, filed Oct. 28, 2016, which is incorporated herein by reference in its entirety.

BACKGROUND OF THE INVENTION

1. Technical Field

This invention relates generally to textile sleeves for protecting elongate members, and more particularly to shrinkable sleeves having multiple cavities extending lengthwise along the sleeve.

2. Related Art

It is known to contain elongate members, such as wires, wire harnesses, cables and conduits of various types in woven and knit sleeves to provide protection to the elongate members against impact and abrasion, fluid and thermal affects. When routing multiple elongate members alongside one another, it is common to fix separate sleeves to one another, such as by wrapping tape, tie straps, or the like, about the separate sleeves, thereby maintaining a bundle of separate sleeves, and elongate members contained therein, in fixed relation to one another. Although this can prove generally effective for bundling the sleeves/elongate members with one another, it requires extra labor and cost to bundle them together. Further, the tape, tie straps, or the like, can become damaged over time, thereby potentially allowing the separate sleeves to become detached from one another. Further yet, the tape, tie strap or the like can prove bulky and/or unsightly.

SUMMARY OF THE INVENTION

In accordance with one aspect of the disclosure, a textile sleeve for routing and protecting elongate members is provided. The sleeve includes a single piece, monolithic wall of interlaced yarn extending lengthwise between opposite ends of the sleeve. The wall includes a plurality of circumferentially continuous, tubular wall sections extending lengthwise between the opposite ends, with adjacent tubular wall sections being fixed in laterally spaced relation from another by an intervening single layer section. At least some of the yarn within each tubular wall section is provided as heat-shrinkable yarn, thereby providing each tubular wall section as being heat-shrinkable from a first, diametrically enlarged assembly state to a second, diametrically constricted state about a corresponding elongate member contained therein.

In accordance with yet another aspect of the disclosure, each or some of the plurality of circumferentially continuous, tubular wall sections can be provided having a plurality of separate cavities extending lengthwise in relative overlying/underlying/side-by-side relation with one another between the opposite ends, wherein the plurality of separate cavities can include 2 or more separate cavities separated from one another by a wall of interlaced filaments.

Another aspect of the disclosure provides an elongate textile sleeve for routing and protecting a plurality of elongate members in spaced relation from one another without a need for separate fastening mechanisms (e.g. tape, tie straps, wire, string) to fix the plurality of elongate members in relative laterally spaced relation from one another. The sleeve includes a single piece, monolithic wall woven with warp yarns extending lengthwise between opposite ends of the sleeve and fill yarn(s) extending generally transversely to the warp yarns. The wall includes a plurality of circumferentially continuous, tubular wall sections extending lengthwise in parallel or substantially parallel (meaning slight deviations from true parallel are contemplated herein, such that the tubular wall sections may meander off true parallel with one another, but will generally be recognized by one skilled in the art as being parallel with one another) relation with one another between the opposite ends. Adjacent tubular wall sections are fixed in laterally spaced relation from another by an intervening woven single layer section, wherein the intervening section(s) include a plurality of warp yarns woven with the fill yarn(s). At least some of the fill yarn within each tubular wall section is provided as heat-shrinkable yarn (generally known by those skilled in the art as yarn being capable of shrinking between about 10-60% or more over its length upon exposure to a suitable heat source), thereby allowing each tubular wall section to be heat-shrunk from a first, diametrically enlarged assembly state to a second, diametrically constricted state about a corresponding elongate member contained therein.

In accordance with another aspect of the disclosure, the entirety of the fill yarn within the sleeve can be provided as heat-shrinkable yarn.

In accordance with another aspect of the disclosure, some of the fill yarn within the sleeve can include non-heat-shrinkable multifilament yarn, thereby enhancing the coverage, softness and flexibility of the sleeve.

In accordance with another aspect of the disclosure, the entirety of the warp yarns can be provided as non-heat-shrinkable multifilaments and/or monofilaments, thereby preventing the sleeve from shrinking in length and also providing the sleeve with enhanced physical properties, such as abrasion resistance, coverage, softness, flexibility, rigidity, depending on the materials used, as will be readily understood by one possessing ordinary skill in the textile arts.

In accordance with another aspect of the disclosure, the warp yarns can be provided as at least one or more of PET, nylon, PP, PE, PPS, PEEK, and Nomex.

In accordance with another aspect of the disclosure, an elongate textile sleeve for routing and protecting a plurality of elongate members in spaced relation from one another includes a single piece, monolithic wall constructed of weft knit stitches. The wall includes a plurality of circumferentially continuous, tubular wall sections extending lengthwise in parallel or substantially parallel relation with one another between the opposite ends. Adjacent tubular wall sections are fixed to one another in laterally spaced relation from another by an intervening knit single layer section. At least some of the weft knit stitches within each tubular wall section are formed of heat-shrinkable yarn, thereby allowing each tubular wall section to be heat-shrunk from a first, diametrically enlarged assembly state to a second, diametrically constricted state about a corresponding elongate member contained therein.

In accordance with another aspect of the disclosure, at least some of the knit stitches within each tubular wall section can include non-heat-shrinkable multifilaments and/or monofilaments, thereby enhancing physical properties, such as abrasion resistance, coverage, softness, flexibility, rigidity, depending on the type of yarn materials used, as will be readily understood by one possessing ordinary skill in the textile arts.

In accordance with another aspect of the disclosure, at least some of the knit stitches can be formed from yarn of PET, nylon, PP, PE, PPS, PEEK, and Nomex.

In accordance with another aspect of the disclosure, each or some of the plurality of circumferentially continuous, tubular wall sections in either the woven or knit sleeves discussed above can be formed having a plurality of separate cavities extending lengthwise in over/underlying relation with one another between the opposite ends, wherein the plurality of separate cavities can include 2 or more separate cavities divided from one another by a corresponding woven/knit wall.

In accordance with yet another aspect of the disclosure, a method of constructing an elongate textile sleeve for routing and protecting a plurality of elongate members in spaced relation from one another is provided. The method includes weaving the sleeve as a single piece, monolithic wall with warp yarns extending lengthwise between opposite ends of the sleeve and fill yarns extending generally transversely to the warp yarns. The method further includes weaving the wall including a plurality of circumferentially continuous, tubular wall sections extending lengthwise in parallel or substantially parallel relation with one another between the opposite ends. Further yet, the method includes weaving an intervening woven single layer section, including a plurality of warp yarns, between adjacent tubular wall sections to maintain the adjacent tubular wall sections in predetermined, laterally spaced relation with one another. The method further includes weaving at least some of the fill yarn within each tubular wall section as heat-shrinkable yarn, thereby allowing each tubular wall section to be heat-shrunk from a first, diametrically enlarged assembly state to a second, diametrically constricted fixed state about a corresponding elongate member contained therein.

In accordance with another aspect of the disclosure, the method can include weaving the entirety of the fill yarn as heat-shrinkable yarn.

In accordance with another aspect of the disclosure, the method can include weaving some of the fill yarn including non-heat-shrinkable multifilament and/or monofilament yarn.

In accordance with another aspect of the disclosure, the method can include weaving the warp yarns as non-heat-shrinkable multifilaments and/or monofilaments.

In accordance with another aspect of the disclosure, the method can include weaving the warp yarns as at least one or more of PET, nylon, PP, PE, PPS, PEEK, and Nomex.

In accordance with yet another aspect of the disclosure, a method of constructing an elongate textile sleeve for routing and protecting a plurality of elongate members in spaced relation from one another includes weft knitting the sleeve as a single piece, monolithic wall. The method further includes knitting the wall including a plurality of circumferentially continuous, tubular wall sections extending lengthwise in parallel or substantially parallel relation with one another between the opposite ends. Further yet, knitting an intervening single layer section between adjacent tubular wall sections to maintain the adjacent tubular wall sections in predetermined, laterally spaced relation with one another. The method further includes knitting at least some of the yarn within each tubular wall section with heat-shrinkable yarn, thereby allowing each tubular wall section to be heat-shrunk from a first, diametrically enlarged assembly state to a second, diametrically constricted state about a corresponding elongate member contained therein.

In accordance with yet another aspect of the disclosure, the methods can include weaving or knitting each or some of the plurality of circumferentially continuous, tubular wall sections having a plurality of separate cavities extending lengthwise in relative overlying/underlying/side-by-side relation with one another between the opposite ends, wherein the plurality of separate cavities can include 2 or more separate cavities.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PRESENTLY PREFERRED EMBODIMENTS

Figure 1:
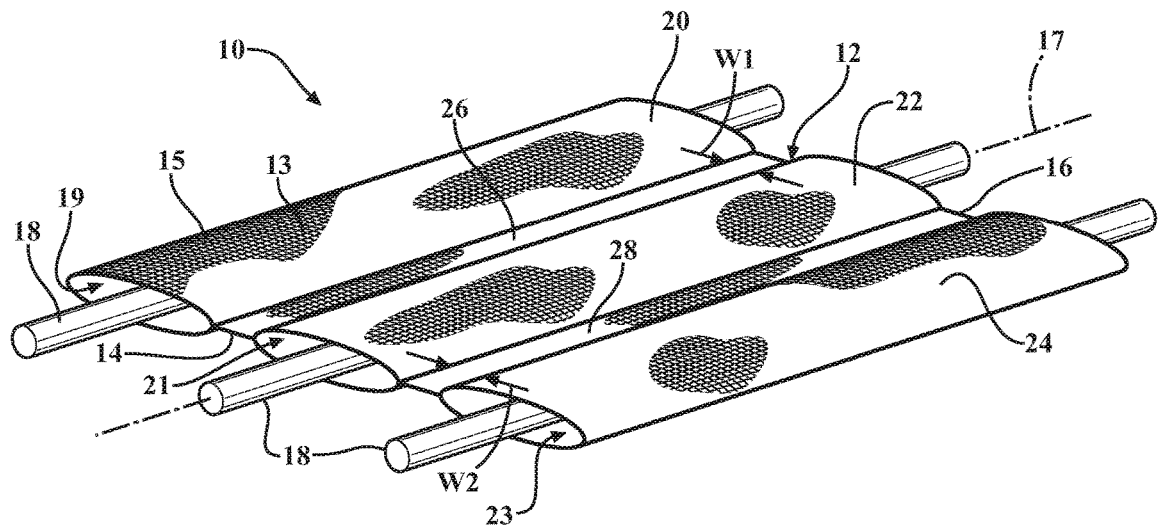
FIG. 1 is a schematic perspective view of a tubular, woven sleeve constructed in accordance with one aspect of the disclosure shown in a non-heat-shrunken, expanded state.
Figure 1A:
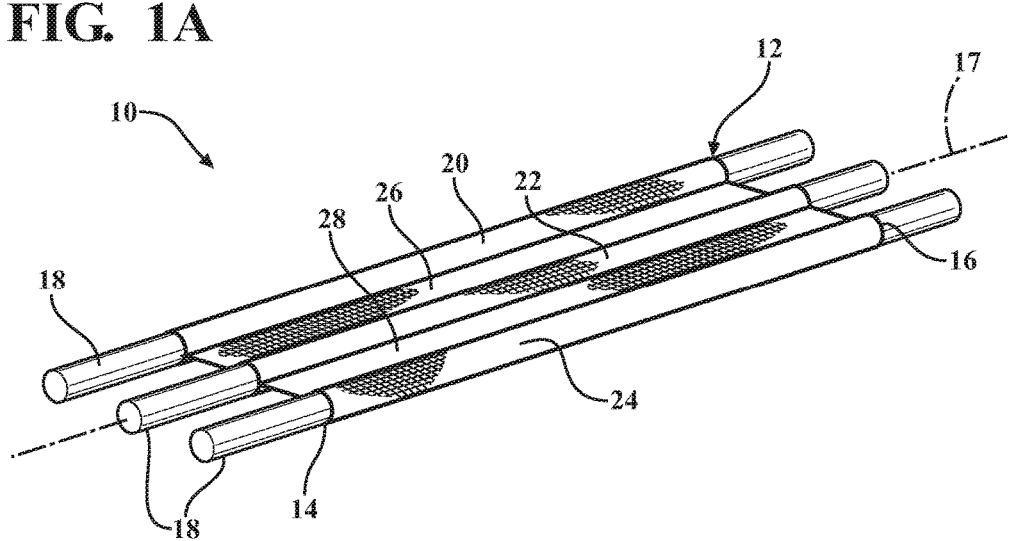
FIG. 1A is a view similar to FIG. 1 with the sleeve shown in a heat-shrunken, contracted state.
Figure 2:
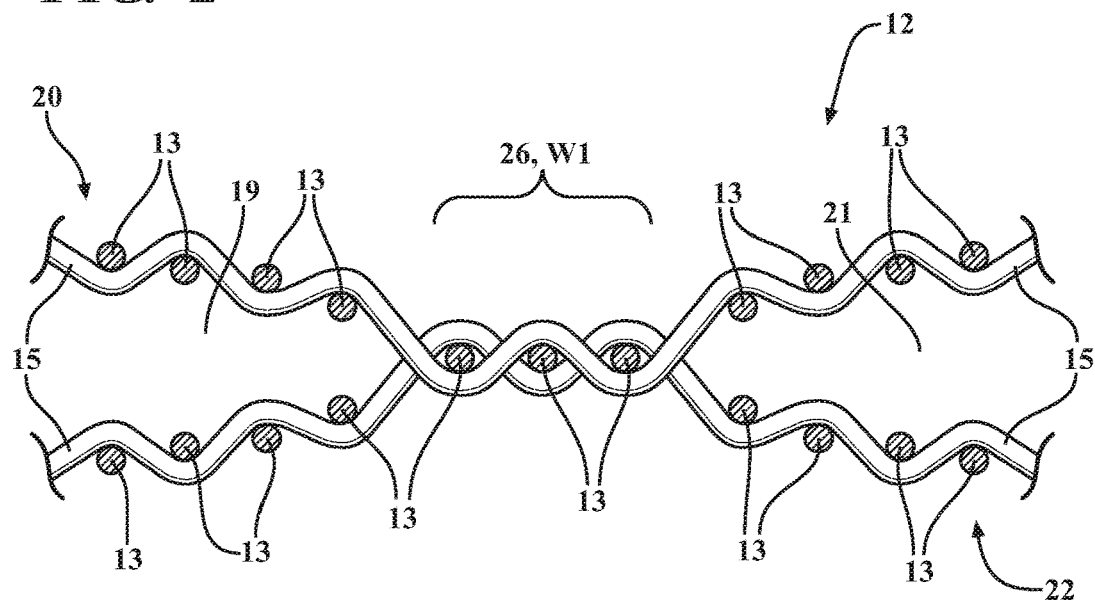
FIG. 2 is a partial schematic cross-sectional view of a wall of the sleeve of FIG. 1 showing woven yarns therein in accordance with one aspect of the disclosure.
Figure 3:
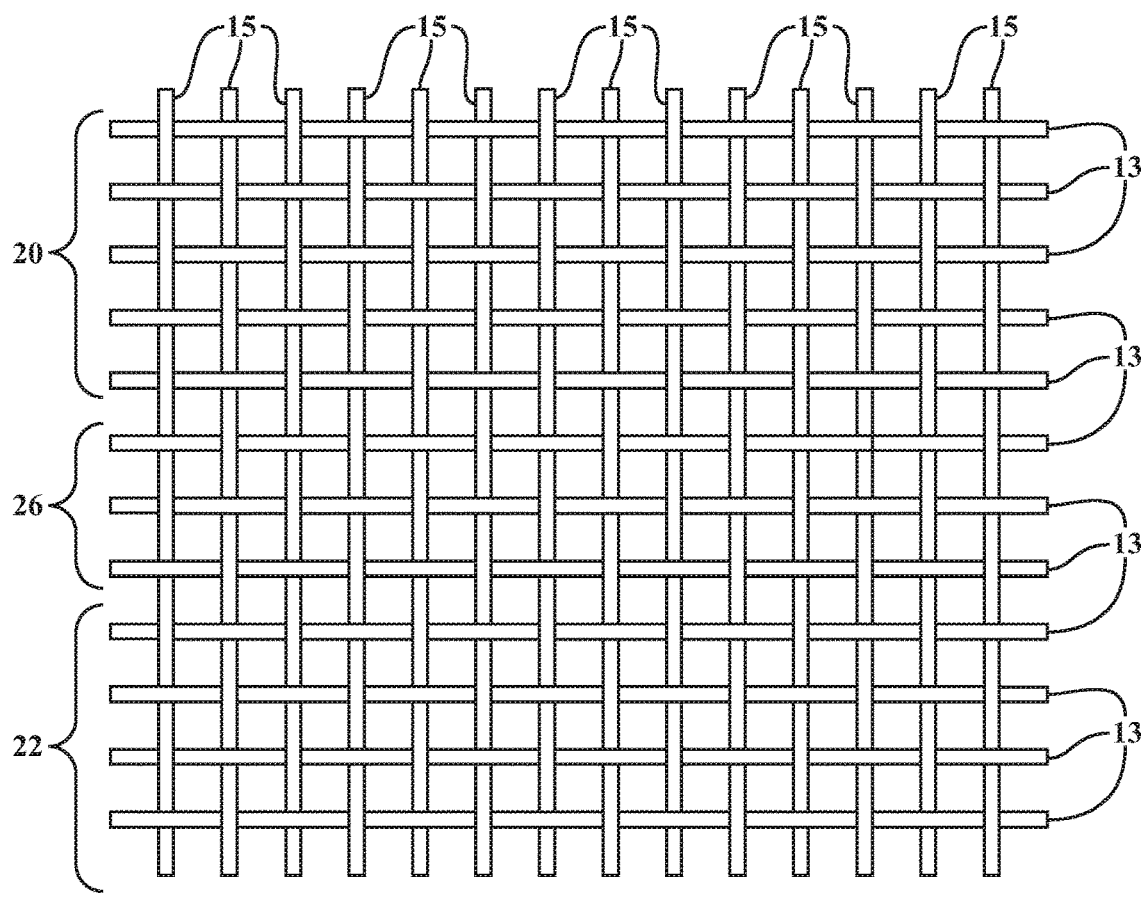
FIG. 3 is an enlarged partial schematic plan view of a wall of the sleeve of FIG. 1 showing woven yarns therein in accordance with another aspect of the disclosure.

Referring in more detail to the drawings, FIG. 1 schematically illustrates a monolithic, single piece sleeve of interlaced yarn(s) (also referred to as filament(s), including multifilament(s) and/or monofilament(s)), shown as a woven protective sleeve, referred to hereafter as sleeve 10, constructed in accordance with one aspect of the disclosure. The sleeve 10 is formed from a single piece, monolithic wall 12 woven with warp yarns 13 extending lengthwise along a longitudinal axis 17 between opposite ends 14, 16 of the sleeve 10 and fill yarns 15 extending generally transversely to the warp yarns 13. The weave pattern used to weave the sleeve 10 can be selected as desired, with a plain weave pattern being shown in FIG. 3, by way of example and without limitation. One skilled in the art understands the meaning of different weave patterns, such as plain, twill, satin, sateen, basket, and others, and thus, further explanation of how the warp and fill yarns 13, 15 undulate over-and-under one another is not necessary. The sleeve 10 is shown with a plurality of elongate members 18 to be protected disposed within cavities 19, 21, 23 of separate circumferentially continuous, isolated tubular wall sections 20, 22, 24 extending lengthwise in parallel relation with the longitudinal axis 17 between the opposite ends 14, 16. Adjacent tubular wall sections 20, 22 are fixed in laterally spaced relation from another by a single layer intervening section 26 having a width W1, and adjacent tubular wall sections 22, 24 are fixed in laterally spaced relation from another by a single layer intervening section 28 having a width W2. At least some or all of the fill yarn 15 within each tubular wall section 20, 22, 24 is provided as heat-shrinkable yarn, thereby allowing each tubular wall section 20, 22, 24 to be heat-shrunk from a first, diametrically enlarged assembly state (FIG. 1) to a second, diametrically constricted state (FIG. 1A) about a corresponding elongate member 18 contained therein. As such, while in the enlarged assembly state, the elongate members 18, such as wires, cables, conduits, and the like, can be readily disposed through the enlarged cavities 19, 21, 23, and then upon heat-shrinking the heat-shrinkable fill yarn 15, the elongate members are retained and substantially fixed within the shrunken cavities 19, 21, 23 against relative axial movement therewith, thereby forming a relatively tight, reduced envelop assembly of the sleeve 10 and elongate members 18.

The warp yarns 13 can be provided as multifilaments and/or monofilaments of at least one or more of PET, nylon, PP, PE, PPS, PEEK, and Nomex material yarns. The denier of the warp yarns 13, if provided as multifilaments, can range from 50 to 10000. It has been found that relatively bulky multifilaments, such as a 1200 denier of PET, by way of example and without limitation, provide the increased loft to further facilitate dampening impact forces, while also enhancing flexibility of the sleeve 10. The warp density, i.e. number of ends of the warp yarns 13, can be adjusted as desired for the intended application, with a high density providing an increased impact resistance, though tending to lessen the ratio of diametric shrink from the "as woven assembly state" to the "assembled" shrunken state.

The fill yarn 15 can be provided entirely as heat-shrinkable yarn, thereby maximizing the shrink ratio capacity of the wall 12, or partially as heat-shrinkable yarn and non-heat-shrinkable yarn, thereby enhancing the protective shielding, flexibility and impact dampening properties of the wall 12, particularly if the non-heat-shrinkable yarn is provided as relatively bulky multifilament yarn. It is to be recognized the heat-shrinkable yarn and the non-heat-shrinkable yarn, if provided, can be provided as monofilament and/or multifilament yarn. Upon shrinking the heat-shrinkable fill yarn 15, the individual tubular wall sections 20, 22, 24 constrict and preferably engage the elongate members 18 to fix the sleeve 10 and the elongate members 18 against relative movement with one another without need for secondary fixation mechanisms, thereby doing away for the need for clamps, straps, tape, or the like, to fix the elongate members 18 relative to the sleeve 10. Further yet, the woven wall 12 becomes densified upon being shrunk, and thus, the protective attributes of the wall 12, such as impact resistance, abrasion resistance, impermeability, among other things, are greatly increased. In addition, with the tubular wall sections 20, 22, 24 being brought into a close, snug fit about the elongate members 18, the thickness and outer dimensional envelop of the sleeve 10 is minimized, thereby being useful in tight areas.

It is to be recognized that the sleeve 10 can be formed including as few a pair of separated tubular wall sections or as many as desired, depending on the application. It is to be further recognized that the widths W1, W2 of the intervening sections 26, 28 can be constructed being the same, thereby spacing the respective tubular wall sections 20, 22, 24 equidistantly from one another, such as by providing each intervening section 26, 28 having the same number of warp yarns 13, and/or that at least some of the widths W1, W2 of the intervening sections 26, 28 can be different from one another, such as by providing each intervening section 26, 28 having a different number of warp yarns 13, as needed for the intended application, which, upon view the disclosure herein, will be readily understood by the skilled artisan. As such, the tubular wall sections 20, 22, 24 can be maintained in the desired laterally spaced relation from one another, whether being spaced equidistantly or differently from one another without the need for secondary fastening mechanisms. Accordingly, the sleeve 10 can be specially tailored for applications as needed to maintain the elongate members 18 in precisely spaced relation from one another, whether being equidistantly spaced from one another or not, via use of the single sleeve 10.

Figure 4:
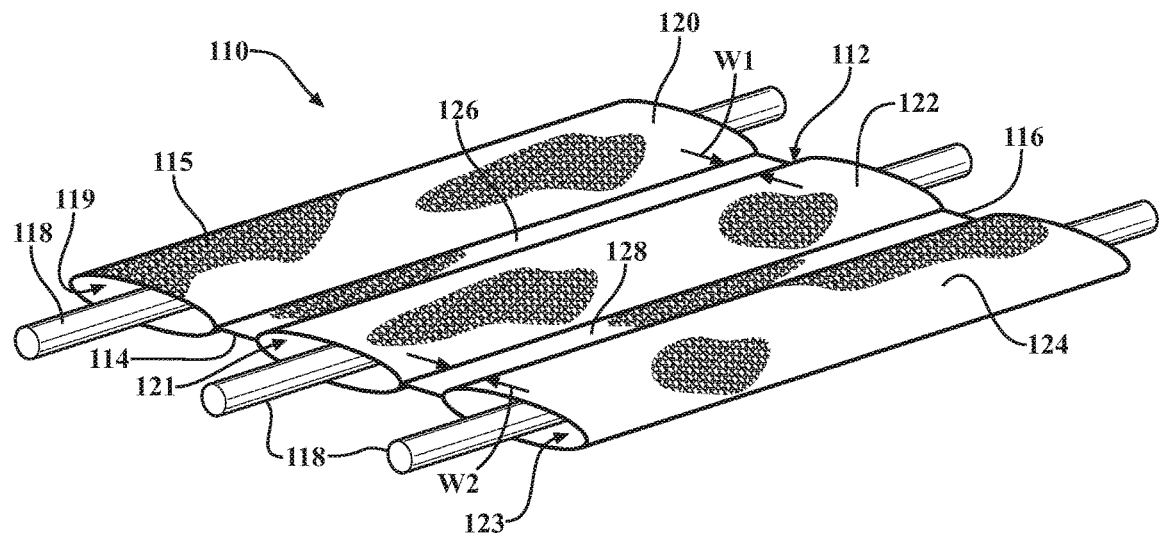
FIG. 4 is a schematic perspective view of a tubular, knit sleeve constructed in accordance with another aspect of the disclosure shown in a non-heat-shrunken, expanded state.
Figure 4A:
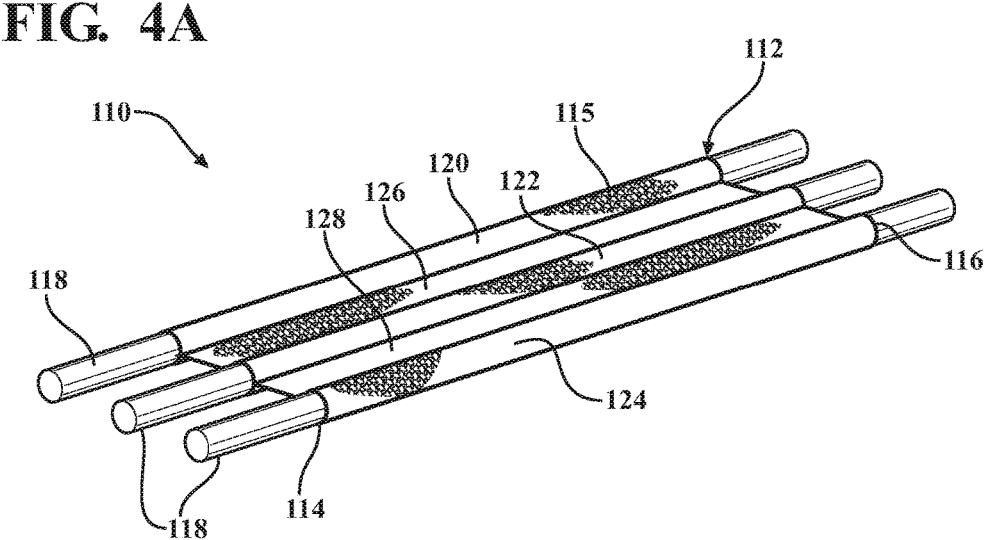
FIG. 4A is a view similar to FIG. 4 with the sleeve shown in a heat-shrunken, contracted state.

In FIGS. 4 and 4A, a monolithic, single piece knitted protective sleeve, referred to hereafter as sleeve 110, constructed in accordance with another aspect of the disclosure is shown, wherein the same reference numerals, offset by a factor of 100, are used to identify like features. The sleeve 110 is formed from a single piece, monolithic wall 112 knit with weft stitches 115. The sleeve 110 is shown with a plurality of elongate members 118 to be protected disposed within cavities 119, 121, 123 of separate circumferentially continuous, isolated tubular wall sections 120, 122, 124 extending lengthwise between the opposite ends 114, 116. Adjacent tubular wall sections 120, 122 are fixed in laterally spaced, isolated relation from another by a single layer intervening section 126, and adjacent tubular wall sections 122, 124 are fixed in laterally spaced, isolated relation from one another by a single layer intervening section 128. At least some or all of the yarn forming the weft stitches 115, within each tubular wall section 120, 122, 124, is provided as heat-shrinkable yarn, thereby allowing each tubular wall section 120, 122, 124 to be heat-shrunk from a first, diametrically enlarged assembly state (FIG. 4) to a second, diametrically constricted finished assembled state (FIG. 4A) about a corresponding elongate member 118 contained therein. As such, while in the enlarged assembly state, the elongate members 118, such as wires, cables, conduits, and the like, can be readily disposed through the cavities 119, 121, 123, and then upon heat-shrinking the heat-shrinkable weft stitches 115, the elongate members are retained and substantially fixed within the cavities 119, 121, 123, thereby forming a relatively tight, reduced envelop assembly of the sleeve 110 and elongate members 118. It is to be recognized that the intervening sections 126, 128 can be formed having the same widths W1, W2 or different widths W1, W2 extending between the respective tubular wall sections 120, 122, 124 as desired for the intended application, as discussed above, such as by varying the size and/or number of weft knit stitches 115 formed within the respective intervening sections 126, 128. Accordingly, one of the intervening sections 126, 128 can be formed having more or less and/or larger or smaller weft knit stitches 115 than the other of the intervening sections 126, 128, if desired to space the elongate members 118 differently from one another.

Figure 5:
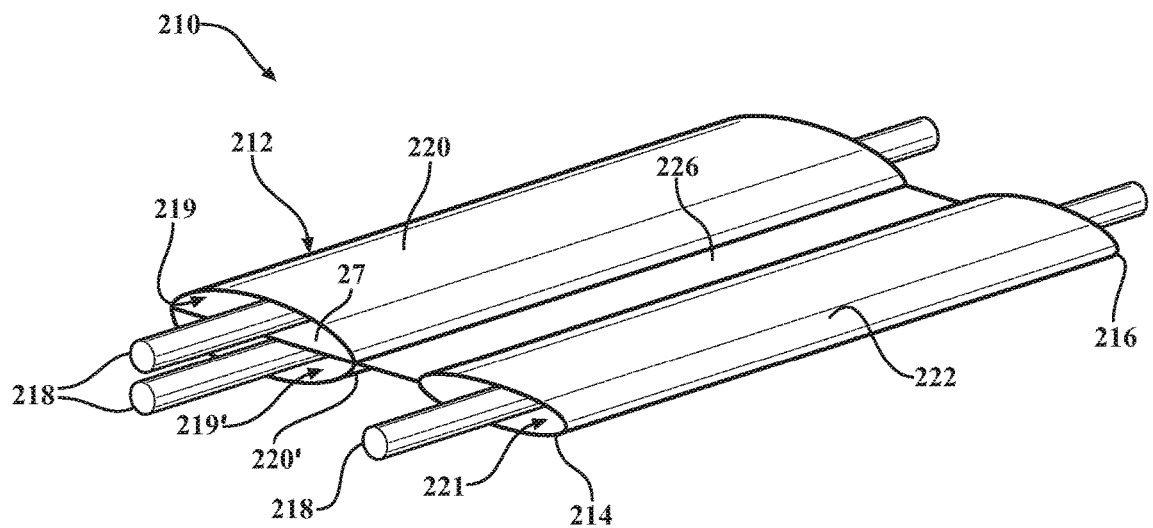
FIG. 5 is a schematic perspective view of a sleeve constructed in accordance with another aspect of the disclosure shown in a non-heat-shrunken, expanded state.
Figure 5A:
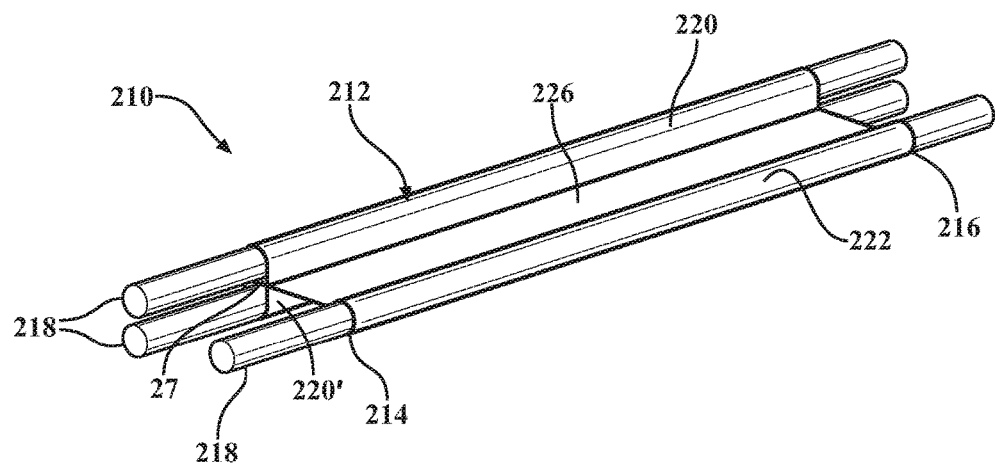
FIG. 5A is a view similar to FIG. 5 with the sleeve shown in a heat-shrunken, contracted state.

In FIGS. 5 and 5A, a monolithic, single piece protective sleeve, referred to hereafter as sleeve 210, constructed in accordance with another aspect of the disclosure is shown, wherein the same reference numerals, offset by a factor of 200, are used to identify like features. The sleeve 210 is formed as a single piece, monolithic wall 212 having one of a woven wall structure, such as discussed above for the wall 12 or a knitted wall structure, such as discussed above for the wall 112. The sleeve 210 is shown with a plurality of elongate members 218 to be protected disposed within cavities 219, 219', 221 of separate circumferentially continuous, tubular wall sections 220, 220', 222, extending lengthwise between the opposite ends 214, 216. The tubular wall sections 220, 220' and tubular wall section 222 are fixed in laterally spaced relation from another by a single layer intervening section 226, and immediately adjacent and overlying tubular wall sections 220, 220' are separated and isolated from one another by a single layer intervening section 27. At least some or all of the yarn forming the tubular wall sections 220, 220', 222 is provided as heat-shrinkable yarn, thereby allowing each tubular wall section 220, 220', 222 to be heat-shrunk from a first, diametrically enlarged assembly state (FIG. 5) to a second, diametrically constricted state (FIG. 5A) about a corresponding elongate member 218 contained therein. As such, while in the enlarged assembly state, the elongate members 218, such as wires, cables, conduits, and the like, can be readily disposed through the individual cavities 219, 219', 221 and then upon heat-shrinking the heat-shrinkable yarn, the elongate members are retained and substantially fixed within the individual, isolated cavities 219, 219', 221, thereby forming a relatively tight, reduced envelop assembly of the sleeve 210 and elongate members 218.

Figure 6:
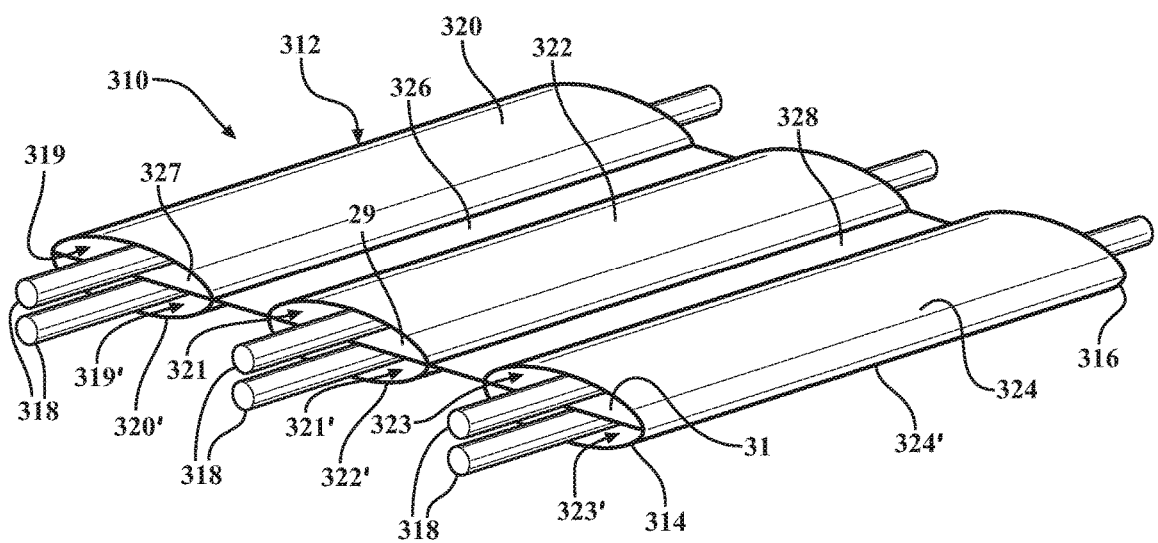
FIG. 6 is a schematic perspective view of a sleeve constructed in accordance with another aspect of the disclosure shown in a non-heat-shrunken, expanded state.
Figure 6A:
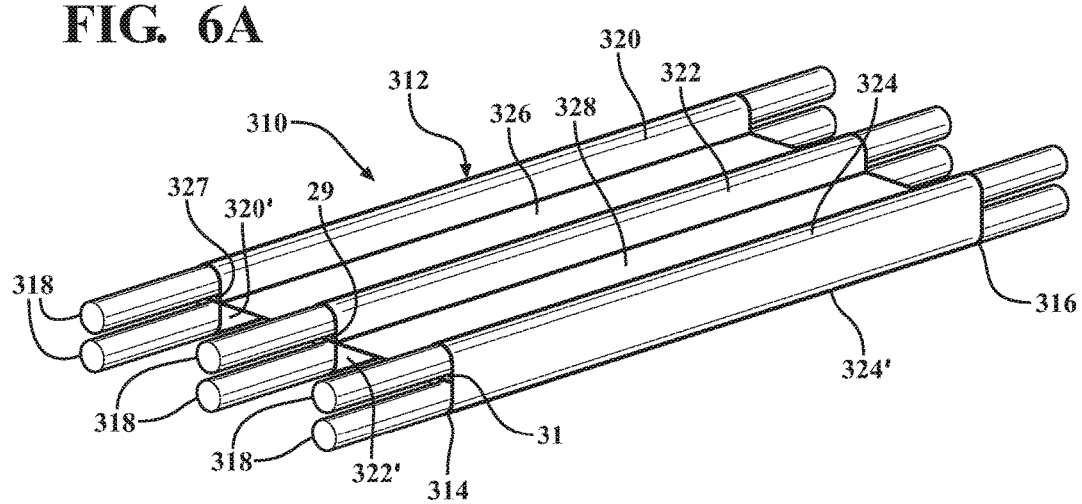
FIG. 6A is a view similar to FIG. 6 with the sleeve shown in a heat-shrunken, contracted state.

In FIGS. 6 and 6A, a monolithic, single piece protective sleeve, referred to hereafter as sleeve 310, constructed in accordance with another aspect of the disclosure is shown, wherein the same reference numerals, offset by a factor of 300, are used to identify like features. The sleeve 310 is formed as a single piece, monolithic wall 312 having one of a woven wall structure, such as discussed above for the wall 12 or a knitted wall structure, such as discussed above for the wall 112. The sleeve 310 is shown with a plurality of elongate members 318 to be protected disposed within cavities 319, 319', 321, 321', 323, 323' of separate circumferentially continuous, isolated tubular wall sections 320, 320', 322, 322', 324, 324' extending lengthwise between the opposite ends 314, 316. The tubular wall sections 320, 320' are fixed in laterally spaced, isolated relation from the tubular wall sections 322, 322' by a single layer intervening section 326 and the tubular wall sections 322, 322' are fixed in laterally spaced, isolated relation from the tubular wall sections 324, 324' by a single layer intervening section 328. The immediately adjacent and overlying tubular wall sections 320, 320' are separated from one another by a single layer intervening section 327; the immediately adjacent and overlying tubular wall sections 322, 322' are separated from one another by a single layer intervening section 29; and the immediately adjacent and overlying tubular wall sections 324, 324' are separated from one another by a single layer intervening section 31. At least some or all of the yarn forming the tubular wall sections 320, 320', 322, 322', 324, 324' is provided as heat-shrinkable yarn, thereby allowing each tubular wall section 320, 320', 322, 322', 324, 324' to be heat-shrunk from a first, diametrically enlarged assembly state (FIG. 6) to a second, diametrically constricted state (FIG. 6A) about a corresponding elongate member 318 contained therein. As such, while in the enlarged assembly state, the elongate members 318, such as wires, cables, conduits, and the like, can be readily disposed through the cavities 319, 319', 321, 321', 323, 323' and then upon heat-shrinking the heat-shrinkable yarn, the elongate members 318 are retained and substantially fixed within the cavities 319, 319', 321, 321', 323, 323', thereby forming a relatively tight, reduced envelop assembly of the sleeve 310 and elongate members 318.

Figure 7:
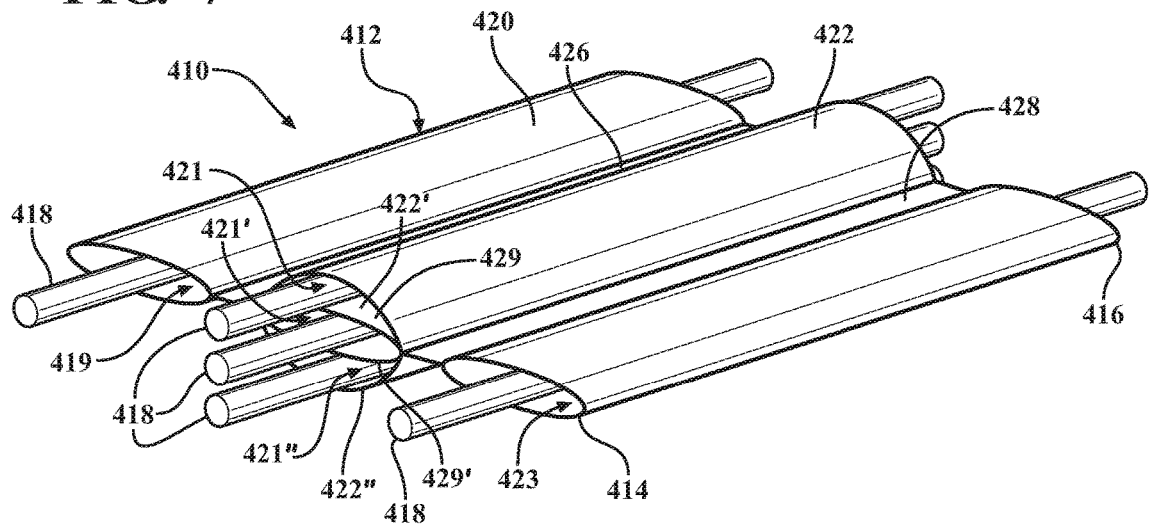
FIG. 7 is a schematic perspective view of a sleeve constructed in accordance with another aspect of the disclosure shown in a non-heat-shrunken, expanded state.
Figure 7A:
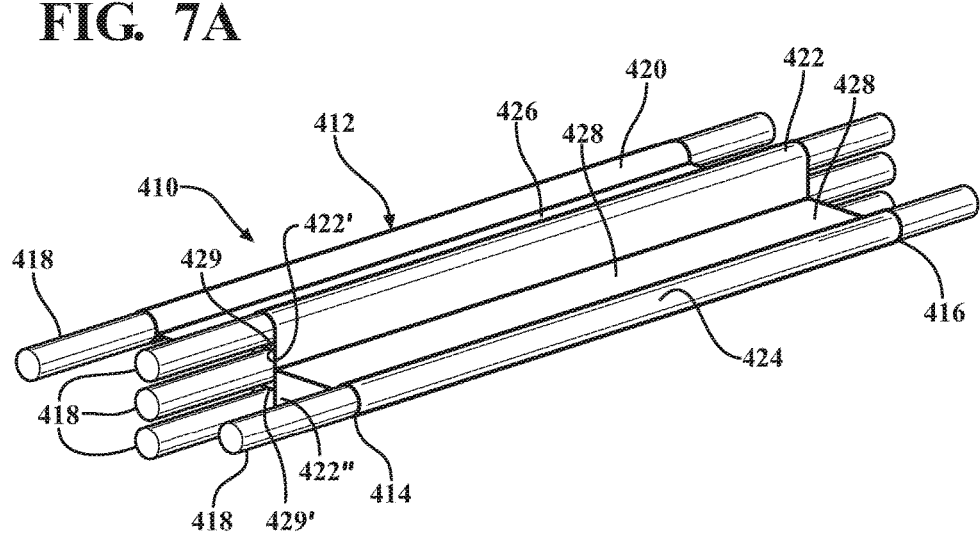
FIG. 7A is a view similar to FIG. 7 with the sleeve shown in a heat-shrunken, contracted state.

In FIGS. 7 and 7A, a monolithic, single piece protective sleeve, referred to hereafter as sleeve 410, constructed in accordance with another aspect of the disclosure is shown, wherein the same reference numerals, offset by a factor of 400, are used to identify like features. The sleeve 410 is formed as a single piece, monolithic wall 412 having one of a woven wall structure, such as discussed above for the wall 12 or a knitted wall structure, such as discussed above for the wall 112. The sleeve 410 is shown with a plurality of elongate members 418 to be protected disposed within cavities 419, 421, 421', 421'', 423 of separate circumferentially continuous, isolated tubular wall sections 420, 422, 422', 422'', 424 extending lengthwise between the opposite ends 414, 416. The tubular wall section 420 is fixed in laterally spaced, isolated relation from the tubular wall sections 422, 422', 422'' by a single layer intervening section 426 and the tubular wall sections 422, 422', 422'' are fixed in laterally spaced, isolated relation from the tubular wall section 424 by a single layer intervening section 428. The immediately adjacent and overlying tubular wall sections 422, 422' are separated from one another by a single layer intervening section 429 and the immediately adjacent and overlying tubular wall sections 422', 422'' are separated from one another by a single layer intervening section 429'. At least some or all of the yarn forming the tubular wall sections 420, 422, 422', 422'', 424 is provided as heat-shrinkable yarn, thereby allowing each tubular wall section 420, 422, 422', 422'', 424 to be heat-shrunk from a first, diametrically enlarged assembly state (FIG. 7) to a second, diametrically constricted state (FIG. 7A) about a corresponding elongate member 418 contained therein. As such, while in the enlarged assembly state, the elongate members 418, such as wires, cables, conduits, and the like, can be readily disposed through the cavities 419, 421, 421', 421'', 423 and then upon heat-shrinking the heat-shrinkable yarn, the elongate members 418 are retained and substantially fixed within the cavities 419, 421, 421', 421'', 423, thereby forming a relatively tight, reduced envelop assembly of the sleeve 410 and elongate members 418.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting elongate members, comprising:
a single piece, monolithic wall of interlaced yarn extending lengthwise between opposite ends of the sleeve, said wall including a plurality of circumferentially continuous, tubular wall sections extending lengthwise between said opposite ends, adjacent tubular wall sections being fixed in laterally spaced relation from another by an intervening single layer section having a plurality of lengthwise extending yarns interlaced with a plurality of circumferentially extending yarns, at least some of said yarn within each said tubular wall section being heat-shrinkable yarn, each said tubular wall section being heat-shrinkable from a first, diametrically enlarged assembly state to a second, diametrically constricted state about a corresponding elongate member contained therein.

2. The textile sleeve of claim 1, wherein the wall is woven with warp yarns extending lengthwise between opposite ends of the sleeve and fill yarns extending generally transversely to the warp yarns, wherein at least some of said fill yarn is provided as said heat-shrinkable yarn.

3. The textile sleeve of claim 2, wherein the entirety of the fill yarn is heat-shrinkable yarn.

4. The textile sleeve of claim 2, wherein the fill yarn includes non-heat-shrinkable multifilament yarn.

5. The textile sleeve of claim 2, wherein the warp yarns include non-heat-shrinkable multifilaments and/or monofilaments.

6. The textile sleeve of claim 5, wherein the entirety of the warp yarns include non-heat-shrinkable multifilaments and/or monofilaments.

7. The textile sleeve of claim 1, wherein the wall is weft knit from weft knit stitches.

8. The textile sleeve of claim 7, wherein at least some of the weft knit stitches within each tubular wall section include non-heat-shrinkable filaments.

9. The textile sleeve of claim 7, wherein the entirety of the weft knit stitches within each tubular wall section include heat-shrinkable filaments.

10. A textile sleeve for routing and protecting elongate members, comprising:
a single piece, monolithic wall of interlaced yarn extending lengthwise between opposite ends of the sleeve, said wall including a plurality of circumferentially continuous, tubular wall sections extending lengthwise between said opposite ends, adjacent tubular wall sections being fixed in laterally spaced relation from another by an intervening single layer section having a plurality of lengthwise extending yarns interlaced with a plurality of circumferentially extending yarns, at least some of said yarn within each said tubular wall section being heat-shrinkable yarn, each said tubular wall section being heat-shrinkable from a first, diametrically enlarged assembly state to a second, diametrically constricted state about a corresponding elongate member contained therein, wherein at least one of the plurality of circumferentially continuous, tubular wall sections includes a plurality of separate cavities extending lengthwise in side-by-side relation with one another between the opposite ends, wherein the plurality of separate cavities are separated from one another by a wall of the interlaced yarn.

11. A method of constructing an elongate textile sleeve for routing and protecting a plurality of elongate members in spaced relation from one another, comprising:
interlacing yarn to form a single piece, monolithic wall;
forming the wall including a plurality of circumferentially continuous, tubular wall sections extending lengthwise between the opposite ends;
forming an intervening single layer section having a plurality of lengthwise extending yarns interlaced with a plurality of circumferentially extending yarns between adjacent tubular wall sections to maintain the adjacent tubular wall sections in laterally spaced relation with one another; and
interlacing at least some of the yarn within each tubular wall section as heat-shrinkable yarn, thereby allowing each tubular wall section to be heat-shrunk from a first, diametrically enlarged assembly state to a second, diametrically constricted state about a corresponding elongate member contained therein.

12. The method of claim 11, further including forming at least one of the plurality of circumferentially continuous, tubular wall sections including a plurality of separate cavities extending lengthwise in side-by-side relation with one another between the opposite ends.

13. The method of claim 11, further including performing the interlacing by weaving warp yarns extending lengthwise between opposite ends of the sleeve with fill yarns extending generally transversely to the warp yarns.

14. The method of claim 13, further including weaving the entirety of the fill yarn as heat-shrinkable yarn.

15. The method of claim 13, further including weaving the fill yarn including non-heat-shrinkable multifilament yarn.

16. The method of claim 13, further including weaving the warp yarns as non-heat-shrinkable yarn.

17. The method of claim 11, further including performing the interlacing in a weft knitting process.

18. The method of claim 17, further including forming at least some of the knit stitches within each tubular wall section from non-heat-shrinkable yarn.

19. The method of claim 17, further including forming each of the knit stitches within each tubular wall section from heat-shrinkable yarn.

20. The method of claim 12, further including separating the cavities from one another by a wall of the interlaced yarn.

* * * * *